Dec. 13, 1955

R. B. SIMS 2,726,541

MEASURING APPARATUS FOR ROLLING OR
DRAWING SHEET OR STRIP MATERIAL
Filed Nov. 26, 1952

Inventor:-
Raymond Bernard Sims,

By Pierce, Scheffler & Parker,
Attorneys.

United States Patent Office 2,726,541
Patented Dec. 13, 1955

2,726,541

MEASURING APPARATUS FOR ROLLING OR DRAWING SHEET OR STRIP MATERIAL

Raymond Bernard Sims, Sheffield, England

Application November 26, 1952, Serial No. 322,636

Claims priority, application Great Britain November 27, 1951

5 Claims. (Cl. 73—88.5)

The present invention relates to the production of sheet or strip material by rolling or by drawing, and more particularly is concerned with apparatus for measuring the thickness of the sheet or strip produced.

In such production the material entering between the rolls or opposing die surfaces may vary in thickness and other properties along its length and across its width as the result of previous treatment. In order to control the thickness of the issuing sheet or strip it is desirable to be able to measure its thickness and adjust the reducing conditions accordingly. Even if the reducing apparatus is such that means are provided for automatically adjusting the reducing conditions to maintain the issuing thickness constant, it is still necessary to be able to measure the thickness initially in order to adjust the conditions to attain the desired thickness, after which the automatic means may be left with periodic monitoring to maintain the thickness at its desired value.

None of the instruments for measuring the thickness of rolled strip which are available at present is entirely satisfactory. The chief disadvantage of existing instruments is that they work close to the strip and are therefore easily damaged by what is known to those acquainted with the art as a cobble. Another disadvantage is that the instruments cannot be placed close to the roll gap so that there is a delay in the rolling of the strip and indication of its thickness.

The present invention enables these disadvantages to be overcome since the measurement of strip thickness is indirect, being derived from a measurement of the initial roll setting and of the force tending to separate the rolls. As all the measuring apparatus can be placed away from the mill there is no danger of damage from a cobble, and since the rolls themselves are employed in the measurement there is no delay between rolling the strip and indication of its thickness. Furthermore, the present invention enables the average thickness across the strip to be measured at all points throughout the entire length of a coil. This is an important advantage since it is at the beginning and end of a coil where the greatest variations in thickness occur due to the effects of acceleration and deceleration of the mill.

The present invention provides a new or improved method of measuring the thickness of material issuing from a reducing mill, based on the following facts which the applicant has discovered. For convenience these facts and the description hereafter will be explained in relation to the passage of metal strip between rolls, but it will be readily apparent that they are equally applicable to strip of materials other than metal, to sheet of any suitable material, and to drawing, the drawing being, for example, through dies of the kind having opposing die surfaces whose separation is adjustable.

Before the strip is rolled the gap, i. e. the minimum distance, between the rolls is set to some value less than the desired thickness of the rolled strip. This distance, usually termed the roll setting, will be denoted herein by $S_0$. In large mills for rolling thin wide strip, the rolls are often forced together under a preload instead of being set with an actual gap between them. In these circumstances, the actual distance between the rolls is zero, but the roll setting is taken as that distance the adjacent roll surfaces would be apart if they could pass through each other and is written negatively. The value of such a negative roll setting due to a preload is determined by the amount of longitudinal travel of the screws or other gap-adjusting means after the rolls have been brought into contact.

The method of measuring the thickness of the strip in the present invention is dependent upon a relationship discovered by the applicant. The separating force arising from the plastic deformation of the strip will lift the rolls apart against the elastic restraint of the mill housings, screws and the rolls themselves. The strip thus emerges at a greater thickness than the roll setting. These distortions in the mill are elastic and therefore they obey Hooke's law and there is a linear relationship between the roll load of separating force, F, and the difference between the rolled strip thickness, $h$, and the roll setting $S_0$, which may be written in the form, $$F = M(h - S_0) \tag{1}$$

where M is the elastic constant or factor of proportionality or spring of the mill. If F is measured in tons and $h$ and $S_0$ in inches then M is in tons.in.$^{-1}$ and is the load in the roll gap required to part the rolls by one inch.

Equation 1 may be rewritten in the form $$h = F/M + S_0 \tag{2}$$

Thus, the present invention provides a method of measuring the thickness of sheet or strip material issuing from a reducing mill which comprises producing a first quantity proportional to the separating force engendered between the rolls or dies, producing a second quantity proportional to the setting of the rolls or dies, the proportionality factor of the first quantity being a predetermined number of times greater than the proportionality factor of the second quantity where said predetermined number is equal to the mill spring, and adding the two quantities together to give a total quantity which is proportional to the issuing thickness. The total quantity may be applied to a suitable indicator calibrated to give a direct reading of issuing thickness.

If electrical quantities proportional to $F/M$ and $S_0$ are produced and added together, a measure of strip thickness will be obtained. Although the quantities are preferably electrical ones, they need not be so and may be, for example, fluid pressures or mechanical movements.

Where a wide range of products are rolled in a mill an accurate indication of strip thickness may be difficult to obtain on a single indicator and in one and the preferred form of the apparatus of the present invention the change only in the thickness of the rolled strip from that desired and not the actual thickness is measured.

The thickness rolled, $h$, and the thickness required, $h'$, can be related by the equation: $h = h' + \Delta h$. Then Equation 2 becomes $$\Delta h = F/M + S_0 - h' \tag{3}$$

and an additional quantity proportional to $h'$ must be subtracted from the quantities proportional to $F/M$ and $S_0$ to obtain a measure of variation in strip thickness.

In order that the invention may be more fully and clearly understood, one embodiment thereof will now be described with reference to the accompanying drawing, in which.

Figure 1:
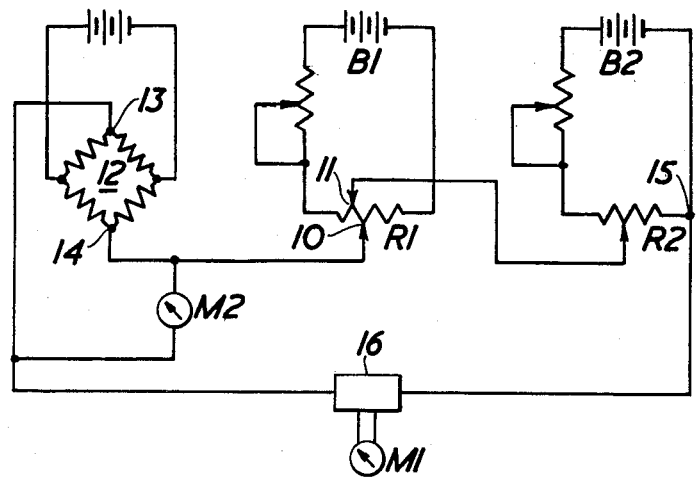
Figure 1 is the electrical circuit of an apparatus in accordance with the invention for measuring the departure from a desired thickness of metal strip issuing from a rolling mill.

Referring to Figure 1, means for providing a potential difference proportional to the roll setting $S_0$ of a rolling mill comprise a resistance $R_1$ provided with two sliding contacts 10 and 11. The position of the contact 10 on the resistance is varied automatically when the roll setting means are adjusted, while the contact 11 provides an adjustable zero to enable negative roll settings to be indicated. The resistance $R_1$ is energised by a source of E. M. F. indicated as a battery $B_1$ and the potential difference between the contacts 10 and 11 is proportional to the roll setting $S_0$.

Means for providing a potential difference proportional to the separating force F comprise a stress indicator for measuring load such as is described in British patent specification No. 626,206. Briefly, the stress indicator comprises four resistance strain gauges connected in a Wheatstone bridge network 12. The strain gauges are supported on a block arranged in the mill structure so that the potential difference produced across the points 13, 14 is proportional to the roll load, F, or more accurately to the quantity $F/M$ (M being a constant for a given mill) since as previously mentioned the proportionality factor of the quantity representing the separating force is M times greater than that representing the roll setting.

Means are also provided for producing a potential difference proportional to the desired thickness $h'$ of the strip issuing from the mill. These means comprise a variable resistance $R_2$ energised by a battery $B_2$ and connected to the zero contact 11 of the resistance $R_1$. Although shown as a resistance with a sliding contact, for convenience, $R_1$ is, in fact, an accurate resistance box. The potential difference appearing across contact 11 and terminal 15 is proportional to the desired issuing thickness $h'$.

It will be seen that the three potential differences proportional to $F/M$, $S_0$ and $h'$ are connected in series in such a way that the potential difference across 13 and 15 is proportional to $F/M+S_0-h'=\Delta h$. The terminals 13 and 15 are connected to a high impedance stable D. C. amplifier 16, which is preferably of the interrupter type. The output of the amplifier is indicated by a meter $M_1$ of the centre-zero type; this meter can be calibrated to give direct readings of $\Delta h$. A meter $M_2$ is connected across 13 and 14 to indicate the separating force or mill load.

Figures 2, 3:
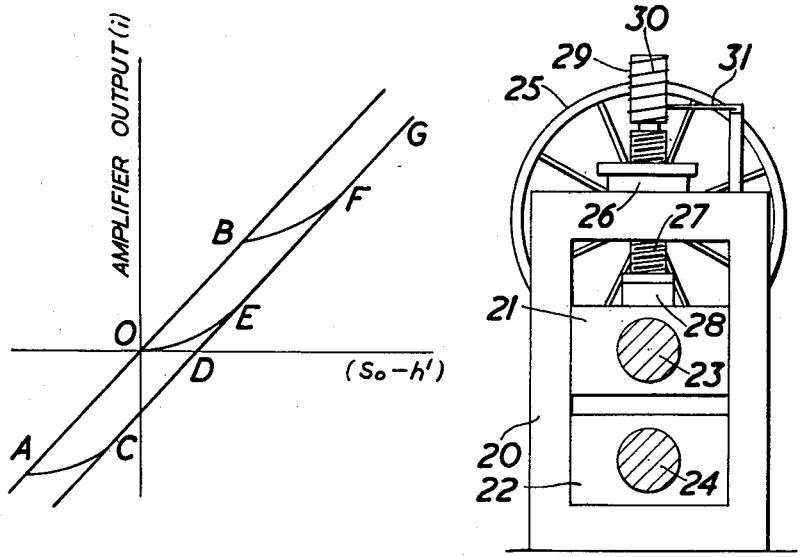
Figure 2 is a graph illustrating the relationship between the amplifier output of the circuit of Figure 1 and the value of $(S_0-h')$.
Figure 3 is a diagrammatic cross-sectional view of a rolling mill fitted with the measuring apparatus.

In Figure 2, the amplifier output current $i$ is plotted against $(S_0-h')$. The line AOB is a curve for $F/M=0$, i. e. with the mill inoperative; this line passes through the origin O when $S_0-h'=0$ and when $S_0=0$, i. e. the rolls are just touching and $h'$ has been set to zero. When rolling takes place $i$ increases along the the line OEG due to the potential difference proportional to $F/M$ which is now produced. From O to E the relation between $i$ and $(S_0-h')$ is non-linear, but above the critical load represented by point E the relation is linear. Similar curves ACG and BFG are obtained when the rolls are preloaded and parted respectively, the point C and F corresponding to the critical load. It will be seen that the output characteristic is linear when the critical load is exceeded but that it is displaced from the origin by the fixed distance OD depending only on the mill characteristics.

Since in actual practice loads below the critical load are not employed, it can be arranged by adjusting $R_1$ that the line CDG passes through the origin, and the meter will thus indicate accurate values of $\Delta h$ for all actual loads.

The manner in which the apparatus can be arranged in a mill is shown diagrammatically in Figure 3. In a mill housing 20, there are arranged chocks 21 and 22 carrying one end of the rolls 23, 24. The gap between the rolls is adjusted by means of a handwheel 25 driving through worm gearing 26 a screw 27 which shifts the upper chock 21. Between screw 27 and chock 21 there is disposed the stress indicator 28 comprising a block carrying the strain gauges arranged as described in patent specification No. 626,206.

A drum 29 is attached to the top of the screw 27 and has a length of resistance wire 30 wound thereon in helical fashion, the pitch of the helix being the same as that of the screw 27. The resistance wire 30 constitutes the resistance $R_1$ of Figure 1, while the sliding contact 10 is provided by a contact 31 engaging the wire. This contact is actually fixed and the resistance wire moves over the contact as the screw 27 is rotated to change the roll setting.

Various modifications of the above-described arrangement for indicating the roll setting are possible. Thus a resistance wire around the periphery of a disc, the wire subtending an angle of, say, 340° can be employed. The disc is driven by the screw through reduction gearing. In the case of a cold rolling mill where variations in roll setting cover a small range, the disc can be attached directly to the screw. In another arrangement, the resistance is arranged remotely of the mill and a sliding contact is moved over the resistance by means of a self-synchronous telemetric system comprising a synchronous motor receiver coupled to a complementary generator transmitter driven by the screw.

The zero of the apparatus may drift due to thermal changes in the mill. It will be unaffected if the mill heats up uniformly, but there is the possibility that when a mill is started up from cold, the rolls and necks will be heated to temperatures in excess of that of the mill frame. Until the mill has reached thermal equilibrium, the zero of the equipment must be checked by setting the $h'$ control to zero and compressing the rolls together under a load greater than the critical value. If the indicating meter does not read zero, the zero of the apparatus must be reset.

The apparatus will indicate accurately a mean thickness across the strip width provided that the rolls do not possess appreciable residual camber during rolling, due either to bending, thermal effects or wear. In most strip mills this condition is fulfilled, since otherwise the strip would be produced with varying thickness laterally across the width.

The apparatus may be modified to give a permanent record by means of a pen recorder. When rolling strip in coil form, a record may be obtained along the whole length of the coil without risk of damage by the end of the strip or coil breakage under tension.

Although in the above described arrangement only the mean thickness across the width of the strip is indicated, a measure of the thickness at either edge may be obtained by measuring the roll setting and separating force at each side.

In an industrial mill the screws must be lifted occasionally far in excess of their normal travel in order to change the work and back-up rolls. The apparatus should be preferably fitted, therefore, to allow for such large changes in the roll setting and be equipped with protective devices to prevent it becoming overloaded.

The present invention can provide apparatus which employs a simple and reliable circuit having a very fast response, and variations in thickness are indicated as they occur since the rolls themselves are involved in the measuring. Since all the apparatus can be arranged well away from the rolled material it cannot be damaged by a cobble.

I claim:

1. In apparatus for reducing the thickness of material, a reducing member having opposed material-engaging surfaces between which a separating force is engendered by the passage of material therethrough, means for adjusting the separation between said opposed surfaces, means controlled by said reducing member to produce a first signal proportional to said separating force, means controlled by said adjusting means to produce a second signal proportional to the separation between said opposed surfaces, the proportionality factor of the second signal being a predetermined number of times greater than the proportionality factor of the first signal where said predetermined number is equal to the mill spring, and means supplied with said first and second signals for producing a further signal substantially proportional to the sum of said first and second signals and hence proportional to the thickness of the material issuing from said reducing member.

2. In a reducing mill, a reducing member having opposed material-engaging surfaces between which a separating force is established by the passage of material therethrough, means for adjusting the separation between said opposed surfaces, means controlled by said reducing member to produce a first electrical signal proportional to the separating force, means controlled by said adjusting means to produce a second electrical signal proportional to the separation between said opposed surfaces, the proportionality factor of the second signal being a predetermined number of times greater than the proportionality factor of the first signal where said predetermined number is equal to the mill spring, and network means supplied with said first and second signals for adding said signals to produce a further electrical signal proportional to the thickness of the material issuing from said reducing member.

3. In apparatus for reducing the thickness of material, a reducing member having opposed material-engaging surfaces between which a separating force is engendered by the passage of material therethrough, means for adjusting the separation between said opposed surfaces, means controlled by said reducing member to produce a first signal proportional to said separating force, means controlled by said adjusting means to produce a second signal proportional to the separation between said opposed surfaces, manually-adjustable means for producing a third signal proportional to the desired thickness of the material issuing from said reducing member, the proportionality factor of the second signal being equal to that of the third signal and a predetermined number of times greater than the proportionality factor of the first signal where said predetermined number is equal to the mill spring, and means supplied with said first, second and third signals and for producing a further signal substantially proportional to the difference between the sum of said first and second signals and said third signal, said further signal being proportional to the departure of the actual issuing thickness from the desired issuing thickness.

4. In a reducing mill, a reducing member having opposed material-engaging surfaces between which a separating force is established by the passage of material therethrough, means for adjusting the separation between said opposed surfaces, means controlled by said reducing member to produce a first electrical signal proportional to the separating force, means controlled by said adjusting means to produce a second electrical signal proportional to the separation between said opposed surfaces, the proportionality factor of the second signal being a predetermined number of times greater than the proportionality factor of the first signal where said predetermined number is equal to the mill spring, manually-adjustable means for producing a third electrical signal proportional to the desired thickness of the material issuing from said reducing member, the proportionality factor of said third signal being equal to that of said second signal, and network means supplied with said first and second signals to produce a further electrical signal equal to the difference between the sum of said first and second signals and the third signal, said further signal being proportional to the difference between the actual and desired thickness of the material issuing from the reducing member.

5. Apparatus as defined in claim 2 wherein said means for producing a first electrical signal proportional to the separating force comprises a stress indicator including resistance strain gauges arranged to provide a first voltage proportional to the separating force, wherein said means for producing a second electrical signal proportional to the separation between the opposed surfaces of said reducing member comprises a resistance wire across which a voltage is maintained and a contact slidably engaging said wire, the position of the contact along the length of wire being adjusted by operation of said means for adjusting the separation between said opposed surfaces whereby a second voltage between one end of said resistance wire and said contact is proportional to the separation between said opposed surfaces, said network means comprises an electrical circuit connecting said first and second voltages in series to effect a sum of said voltages, and which further includes a rolled material thickness indicator responsive to the sum of said voltages.

References Cited in the file of this patent

UNITED STATES PATENTS

| | | |
|---|---|---|
| 2,264,725 | Shoupp et al. | Dec. 2, 1941 |
| 2,275,509 | Dahlstrom | Mar. 10, 1942 |
| 2,276,816 | Bagno | Mar. 17, 1942 |
| 2,352,953 | Haight | July 4, 1944 |
| 2,659,154 | Rendel | Nov. 17, 1953 |

FOREIGN PATENTS

| | | |
|---|---|---|
| 414,785 | Great Britain | Aug. 16, 1934 |
| 640,762 | Great Britain | July 26, 1950 |